(12) United States Patent
Parron et al.

(10) Patent No.: US 12,004,247 B2
(45) Date of Patent: Jun. 4, 2024

(54) USER EQUIPMENT ASSISTANCE INFORMATION FOR VOICE OVER CELLULAR

(71) Applicant: Apple Inc., Cupertino, CA (US)

(72) Inventors: Jerome Parron, Fuerth (DE); Yujian Zhang, Beijing (CN); Ozgur Oyman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 17/440,035

(22) PCT Filed: Jun. 25, 2020

(86) PCT No.: PCT/US2020/039629
§ 371 (c)(1),
(2) Date: Sep. 16, 2021

(87) PCT Pub. No.: WO2020/264166
PCT Pub. Date: Dec. 30, 2020

(65) Prior Publication Data
US 2022/0159760 A1 May 19, 2022

Related U.S. Application Data

(60) Provisional application No. 62/866,222, filed on Jun. 25, 2019.

(51) Int. Cl.
*H04L 12/00* (2006.01)
*H04L 43/0829* (2022.01)
(Continued)

(52) U.S. Cl.
CPC ......... *H04W 76/15* (2018.02); *H04L 43/0835* (2013.01); *H04L 43/0858* (2013.01); *H04W 72/542* (2023.01)

(58) Field of Classification Search
None
See application file for complete search history.

(56) References Cited

U.S. PATENT DOCUMENTS 11,122,619 B2 * 9/2021 Bergström ........ H04W 28/0268
11,240,874 B2 * 2/2022 Jiang .................... H04W 80/04
(Continued)

OTHER PUBLICATIONS

[No Author Listed], "3rd Generation Partnership Project; Technical Specification Group Services and System Aspects; Study on media handling aspects of Radio Access Network (RAN) delay budget reporting in Multimedia Telephony Service for Internet Protocol (IP) Multimedia Subsystem (IMS) (MTSI) (Release 16)", 3GPP TR 26.910, V 16.0.0, Sep. 2018, 24 pages.
(Continued)

*Primary Examiner* — Sithu Ko
(74) *Attorney, Agent, or Firm* — Fish & Richardson P.C.

(57) ABSTRACT

Disclosed are methods, systems, apparatus, and computer programs for providing a network with assistance information from a user equipment (UE) that is participating in a multimedia telephony session. In one aspect, a method includes determining a connection parameter of a multimedia telephony session between a user equipment (UE) and a remote UE. The method further includes generating assistance information based on the connection parameter. Yet further, the method include sending, using a medium access control (MAC) control element, the assistance information to an access node (AN) serving the UE.

18 Claims, 12 Drawing Sheets

(51) Int. Cl.
  *H04L 43/0852* (2022.01)
  *H04W 72/542* (2023.01)
  *H04W 76/15* (2018.01)

(56) References Cited

U.S. PATENT DOCUMENTS

| | | | | |
|---|---|---|---|---|
| 11,265,964 | B2* | 3/2022 | Wei | H04W 76/27 |
| 11,290,939 | B2* | 3/2022 | Wu | H04W 80/02 |
| 11,375,567 | B2* | 6/2022 | Wu | H04W 80/02 |
| 11,523,428 | B2* | 12/2022 | Zhang | H04W 74/0833 |
| 11,617,219 | B2* | 3/2023 | Ma | H04W 76/27 |
| | | | | 370/329 |
| 2015/0229970 | A1* | 8/2015 | Ma | H04L 65/762 |
| | | | | 370/328 |
| 2018/0352092 | A1* | 12/2018 | Rajendran | H04L 69/24 |
| 2019/0045578 | A1* | 2/2019 | Oyman | H04L 43/0852 |

OTHER PUBLICATIONS

[No Author Listed], "3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.5.1, Apr. 2019, 948 pages.

[No Author Listed], "3rd Generation Partnership Project; Technical Specification Group Radio Access Network; NR; Radio Resource Control (RRC) protocol specification (Release 15)," 3GPP TS 38.331 V15.5.1, Apr. 2019, 491 pages.

[No Author Listed], "3rd Generation Partnership Project; Technical Specification Group Services and System Aspects; IP Multimedia Subsystem (IMS); Multimedia Telephony; Media handling and interaction (Release 16)," 3GPP TS 26.114 V 16.2.0, Jun. 2019, 414 pages.

Ericsson, "Introduction of assistance information for DL PDCP duplication (38.425 Baseline CR covering RAN3 agreements)," 3GPP TSG-RAN WG3 Meeting #100, r3-183588, Busan, South Korea, May 21-25, 2019, 11 pages.

Huawei et al., "MAC CE adaptation for NR for TS 38.321," 3GPP TSG-WG2 Meeting #102, R2-1809243, Busan, Korea, May 21-25, 2018, 6 pages.

International Preliminary Report on Patentability in International Appln. No. PCT/US2020/039629, dated Jan. 6, 2022, 14 pages.

International Search Report and Written Opinion in International Appln. No. PCT/US2020/039629, dated Nov. 11, 2020, 22 pages.

Invitation to Pay Additional Fees in International Appln. No. PCT/US2020/039629, dated Sep. 21, 2020, 18 pages.

* cited by examiner

USER EQUIPMENT ASSISTANCE INFORMATION FOR VOICE OVER CELLULAR

CLAIM OF PRIORITY

This application is a U.S. National Phase Application under 35 U.S.C. § 371 and claims the benefit of priority to International Application No. PCT/US2020/039629, filed Jun. 25, 2020, which claims priority to U.S. Provisional Patent Application No. 62/866,222, entitled "UE ASSISTANCE INFORMATION FOR VOICE OVER CELLULAR," filed on Jun. 25, 2019. The above-identified applications are incorporated herein by reference in their entirety.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, and computer programs for providing a network with assistance information from a user equipment (UE) that is participating in a multimedia telephony session.

In one aspect, a method includes determining a connection parameter of a multimedia telephony session between a user equipment (UE) and a remote UE. The method further includes generating assistance information based on the connection parameter. Yet further, the method include sending, using a medium access control (MAC) control element, the assistance information to an access node (AN) serving the UE.

Other versions include corresponding systems, apparatus, and computer programs to perform the actions of methods defined by instructions encoded on computer readable storage devices. These and other versions may optionally include one or more of the following features In some embodiments, the determining the connection parameter of the multimedia telephony session involves measuring an end-to-end delay of the multimedia telephony session.

In some embodiments, generating assistance information based on the connection parameter involves requesting from the remote UE a delay budget of a remote radio link of the remote UE; determining a delay budget for a local radio link of the UE based on at least one of: an end-to-end delay measurement of the multimedia telephony session, or the delay budget of the remote radio link of the multimedia telephony session; and generating a delay budget indicator based on the delay budget for the local radio link, the assistance information including the delay budget indicator.

In some embodiments, determining the connection parameter of the multimedia telephony session involves determining a robustness of a codec used in connection with the multimedia telephony session.

In some embodiments, generating assistance information based on the connection parameter involves generating a robustness indicator based on at least one of: feedback from a jitter buffer indicative of a packet drop rate or robustness of a codec used in connection with the multimedia telephony session to packet loss, where the assistance information includes the robustness indicator.

In some embodiments, the robustness indicator includes a maximum supported packet loss rate over a radio local link of the UE.

In some embodiments, the codec robustness indicator includes a target block error rate (BLER).

In some embodiments, generating assistance information based on the connection parameter involves determining a packet loss rate applicable for a local radio link of the UE based on: (i) a robustness of a codec used in connection with the multimedia telephony session to packet loss, and (ii) a packet loss observed on a remote radio link of the remote UE; and generating a robustness indicator based on the packet loss rate, the assistance information including the robustness indicator.

In some embodiments, the assistance information further includes a request to the access node to adjust a delay budget of a local radio link of the UE.

In some embodiments, the assistance information further including a request to the access node to enable Packet Data Convergence Protocol (PDCP) packet duplication.

In some embodiments, a plurality of Radio Link Control (RLC) bearers are connected to a Packet Data Convergence Protocol (PDCP) entity of the UE, and the assistance information further includes a request to the access node to change a default RLC bearer of the plurality of RLC bearers.

In accordance with another aspect of the present disclosure, a method involves receiving assistance information from a user equipment (UE) engaged in a multimedia telephony session with a remote UE; and modifying, based on the assistance information, at least one of a configuration of a local radio link or a configuration of a layer 2 data plane of the UE.

In some embodiments, the assistance information includes at least one of: (i) a delay budget indicator indicative of a delay budget of the local radio link, or (ii) a robustness indicator indicative of a robustness of a codec used in connection with the multimedia telephony session.

In some embodiments, modifying at least one of the configuration of the local radio link or the configuration of the layer 2 data plane of the UE involves enabling packet data convergence protocol (PDCP) packet duplication; changing a default radio link control (RLC) bearer of a plurality of RLC bearers connected to a PDCP entity of the UE; or changing connected mode DRX (C-DRX) cycle length.

In some embodiments, the PDCP packet duplication is enabled in response to a determination that an end-to-end delay of the multimedia telephony session or a robustness of a codec used in connection with the multimedia telephony session do not meet respective conditions.

In some embodiments, modifying at least one of the configuration of the local radio link or the configuration of the layer 2 data plane of the UE includes using an in-band packet data convergence protocol (PDCP) reconfiguration to: change a default radio link control (RLC) bearer of a Packet Data Convergence Protocol (PDCP) entity of the UE; or enable or disable PDCP data duplication.

In some embodiments, the in-band PDCP reconfiguration uses a new radio (NR) PDCP control protocol data unit (PDU).

In accordance with yet another aspect of the present disclosure, a method involves selecting, based on (i) an audio quality in a multimedia telephony session between a user equipment (UE) and a remote UE, or (ii) an end-to-end delay measurement of the multimedia telephony session, an action to be performed by an access node (AN) that serves the UE. The method further involves sending, to the AN, an indication of the action to be performed.

In some embodiments, sending the indication involves: sending the indication in an Radio Resource Control (RRC) signal, a Packet Data Convergence Protocol (PDCP) control protocol data unit (PDU), or a medium access control (MAC) control element.

In some embodiments, the action is at least one of: enabling data duplication, changing a default radio link control (RLC) bearer of a Packet Data Convergence Protocol (PDCP) entity of the UE, enabling transmission time interval (TTI) bundling, or lowering a Modulation and Coding Scheme (MCS).

DESCRIPTION OF DRAWINGS

Like reference numbers and designations in the various drawings indicate like elements.

DETAILED DESCRIPTION

Figure 1A:
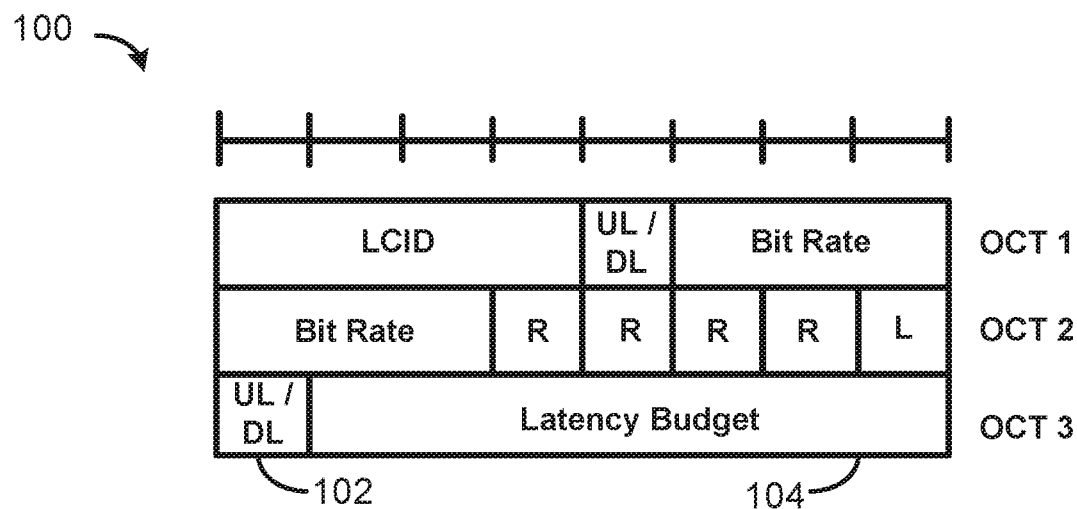
FIGS. 1A and 1B illustrate example Medium Access Control control elements for signaling of a delay budget, according to some embodiments of the present disclosure.

In an Internet protocol (IP) multimedia subsystem (IMS) that offers a multimedia telephony service for IMS (MTSI), such as voice/video over long term evolution (VoLTE) or voice/video over new radio (VoNR), a radio access network (RAN) may use different methods to increase reliability of radio links of a call session (also referred to as a "multimedia telephony session"). These methods include, for example, hybrid automatic repeat request (HARQ) retransmission, transmission time interval (TTI) bundling, and packet data convergence protocol (PDCP) redundancy. These methods may have different impacts on the delay associated with the radio links.

In practice, when selecting a method to improve reliability of a call session, the network may rely on information received from user equipment (UEs) participating in the call session. For example, the network may receive a recommended bit rate from UEs. Additionally, the 3rd Generation Partnership Project (3GPP) has defined methodologies for measuring end-to-end (E2E) delay during a VoLTE or VoNR call and for sharing delay budgets between peer UEs participating in the call. The methodologies involve a real-time transport control protocol (RTCP) feedback message type that enables the following capabilities for signaling delay budget information (DBI) across peer UEs in an IMS telephony session: (i) an MTSI receiver can indicate available delay budget to an MTSI sender, and (ii) an MTSI sender can explicitly request delay budget from an MTSI receiver. These methodologies are described, for example, in 3GPP TS 26.114 (Multimedia Telephony Services over IP Multimedia Systems (MTSI) specification), v16.2.0.

Such RTCP-based signaling of DBI can be used by an MTSI receiver to indicate delay budget availability created via other means, such as jitter buffer size adaptation. The recipient UE of the RTCP feedback message carrying DBI may then use this information in determining the delay budget adjustments it may request from the network over a RAN interface. The UE may request the delay budget adjustments using Radio Resource Control (RRC) signaling based on UEAssistanceInformation, for example, as defined in 3GPP TS 36.331, v15.5.1 and TS 38.331, v15.5.1. Additionally, the UE may use RRC signaling to provide the network with a delay budget report (e.g., as described in 3GPP TS 38.331 and 36.331). This delay budget report uses an enumerated data type to indicative possible values of delays.

However, there are deficiencies in these existing solutions. As an example, the network does not have knowledge of codec (e.g., audio codec) performance used in the call session nor does it have knowledge of the codec's robustness to packet loss. The codec type can dynamically change during the call session without the network being informed. As another example, although the network receives a delay budget report, RRC signaling generally requires additional processing and heavier signaling. Additionally, the coding of the delay report using an enumerated data type limits the number of possible delay values indicted in the message. As yet another example, the delay budget adjustments requested by the UE are limited. For instance, there is no signaling available for a UE to recommend to the network to enable data duplication based on audio quality. Also, there is no signaling available to change a default Radio Link Control (RLC) bearer in cases of dual connectivity (e.g., NR-NR or Evolved-Universal Terrestrial Radio Access-New Radio [EN-DC]).

Disclosed herein are methods and systems that enable a UE participating in a multimedia telephony session to provide the network with connection parameters that enable the network to better configure or reconfigure radio resource allocation based on call quality and/or end-to-end delay of the session. Specifically, disclosed is a signaling message for a UE to report assistance information to the network, where the assistance information includes, for example, a delay budget indicator and a robustness indicator. This signaling message has more flexibility and requires less processing and lighter signaling than the existing RRC signaling of delay budget reports.

Furthermore, the network uses the information provided by the UE to optimize or otherwise improve the radio resource allocation, thereby improving user experience during call. For example, the network can determine to perform a remedial action when the end-to-end (E2E) voice delay is too long (e.g., greater than a threshold) or a robustness is not good enough (e.g., does not satisfy a threshold robustness). The remedial actions may include enabling PDCP packet duplication or changing a connected mode DRX (C-DRX) cycle length. As such, the additional information provided by this disclosure enables the network to better configure the radio resource allocation than existing solutions.

This disclosure also describes in-band signaling (e.g., using a PDCP control message) to perform PDCP related actions. For example, in-band signaling can be used to change a default RLC bearer in scenarios where there are multiple RLC bearers associated with a PDCP entity of the UE, or to control (e.g., enable/disable) PDCP data duplication. The disclosed in-band signaling enables faster reconfiguration of PDCP as compared to existing solutions. Furthermore, this disclosure describes methods for the UE to provide recommendations to the network to enable PDCP data duplication for an IMS voice bearer (e.g., based on audio coder performance) or to change a default Radio Link Control (RLC) bearer in scenarios where dual connectivity is enabled. As described above, existing solutions do not support providing such recommendations.

Media Layer Management Engine in the UE

In an embodiment, a media layer management engine of a UE participating in a multimedia telephony session determines a delay budget for a local radio link of the UE. In an example, the delay budget is determined based on at least one of an end-to-end voice delay measurement or a delay budget request from a peer UE. The media layer management engine then provides the delay budget to a cellular protocol stack of the UE. The delay budget can be determined and provided separately for uplink (UL) and downlink (DL), or can be determined and provided simultaneously for UL and DL.

In an embodiment, the media layer management engine additionally and/or alternatively determines a robustness indicator. In an example, the robustness indicator is determined based on feedback from a jitter buffer with regards to a packet drop rate (e.g., a voice packet drop rate) and a robustness of a codec (e.g., voice codec) to packet loss. The media layer management engine may also provide the robustness indicator to the cellular protocol stack of the UE separately or together with the delay budget.

Cellular Protocol Stack in the UE

In an embodiment, the cellular protocol stack of the UE receives the delay budget and/or the robustness indicator from the media layer management engine. The cellular protocol stack notifies the network (e.g., by way of a base station, such as an eNB or gNB, serving the UE) of the delay budget so that the network can guarantee or otherwise provide acceptable voice/video quality. Additionally and/or alternatively, the cellular protocol stack may notify the network of the robustness indicator. Within examples, the cellular protocol stack can notify the network using RRC signaling, a PDCP control message over the Data Radio Bearer (DRB), or a Medium Access Control (MAC) control element (CE).

Figure 1B:
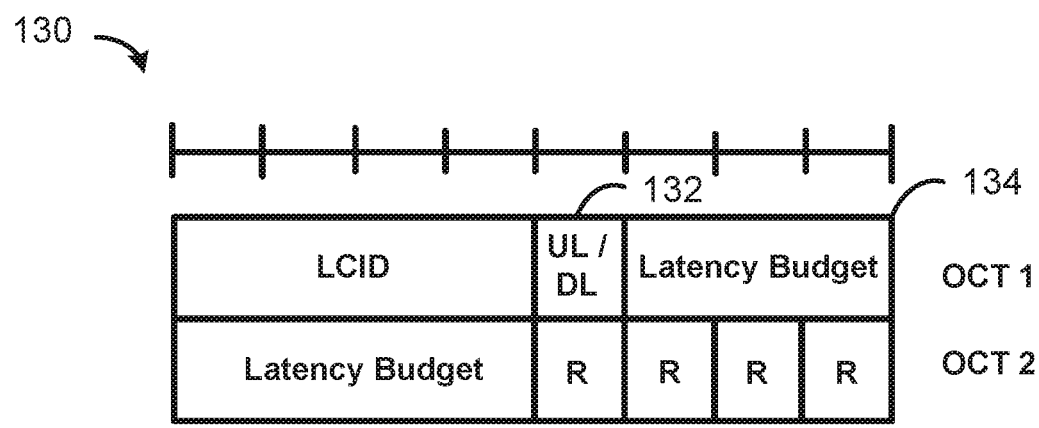

FIGS. 1A and 1B illustrate example Medium Access Control (MAC) control elements (CE) for signaling of a delay budget, according to some implementations. FIG. 1A illustrates an example MAC CE 100. In this example, the MAC CE 100 is an existing bit rate recommendation query message from the UE to a base station. In order to include the delay budget, the MAC CE 100 is extended to include a field that can carry the delay budget. In this example, the MAC CE 100 is extended to include field 102 (UL/DL) and field 104 (Latency Budget). Field 102 is used to indicate whether the signaled the delay budget is for the UL or D, and field 104 is used to indicate the delay budget.

FIG. 1B illustrates an example MAC CE 130. In this example, the MAC CE 130 is a new message for signaling a delay budget. As shown in FIG. 1B, the MAC CE 130 includes field 132 (UL/DL) and field 134 (Latency Budget), where field 132 is used to indicate whether the signaled the delay budget is for UL or DL, and field 134 is used to indicate the delay budget. In both the MAC CE 100 and the MAC CE 130, the Latency Budget value can be provided in millisecond (ms). For example, coding on 7 bits would allow a reporting in the range of 0 to 127 ms.

In an embodiment, if a new MAC CE is introduced, the Logical Channel Identifier list (LCID) may be enhanced as shown in Table 1.

TABLE 1

| Codepoint/Index | LCID values |
| --- | --- |
| 00000 | CCCH |
| 00001-01010 | Identity of the logical channel |
| 01011-01111 | Reserved |
| 10000 | Extended logical channel ID field |
| 10001 | Latency budget |
| 10010 | Activation/Deactivation of PDCP Duplication |
| 10011 | Hibernation (1 octet) |
| 10100 | Hibernation (4 octets) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

NOTE:
Both SC-MCCH and SC-MTCH cannot be multiplexed with other logical channels in the same MAC PDU except for Padding and SC-PTM Stop Indication In this embodiment, LCID 10001 is used for the latency budget MAC CE 230. Alternatively, an extended LCID can be used, as shown in Table 2.

TABLE 2

| Values of eLCID for UL-SCH | | |
| --- | --- | --- |
| Codepoint | Index | LCID values |
| 000000-000110 | 32-38 | Identity of the logical channel |
| 000111-111110 | 39-94 | Reserved |
| 111111 | 95 | Latency budget |

Note that similar enhancements as to those described above can be performed for NR MAC CEs.

In an embodiment, the UE may also report assistance information related to codec robustness to packet loss. Several options for reporting the assistance information are possible. In a first option, the UE can add a flag to a message to recommend to the network to increase robustness. This option may be triggered when the media layer of the UE detects that the decoder (e.g., audio decoder) or codec is reaching its limit in terms of sustaining the current packet loss rate. In a second option, the UE can report a target Block Error Rate (BLER) based on the codec performance.

In an embodiment, this assistance information can be sent to the base station using RRC signaling of MAC Control Element. If MAC CE is used, following options are possible: (i) extension of the existing bit rate recommendation query message from the UE to the eNB, (ii) use of the new MAC CE defined above to report Latency Budget, or (iii) create a new MAC CE.

Network Base Station (eNB and gNB)

Upon reception of the delay budget message from the UE for UL or DL, the network (e.g., by way of a base station) can determine one or more remedial actions to meet the indicated budget requirement. In an example, the one or more remedial actions may be determined based at least one of a radio resource availability, EN-DC support, radio link quality and type of fading, or a number of users to be served. Further, the one or more remedial actions may include: (i) adapting the maximum number of HARQ retransmissions, (ii) enabling/disabling TTI bundling, (iii) enabling split bearer with PDCP redundancy in scenarios of dual connectivity or carrier aggregation, (iv) changing the default radio link in scenarios where dual connectivity is supported, and/or (v) changing a connected mode discontinuous reception (C-DRX) cycle length or disabling C-DRX.

In an embodiment, a PDCP control message is used for in-band PDPC reconfiguration, which enables a rapid reconfiguration of PDCP during a call. In-band reconfiguration is faster than standard PDCP reconfiguration that uses RRC signaling. In particular, the network can trigger in-band PDCP reconfiguration to change the default RLC bearer. This is particularly useful to quickly switch data traffic from LTE to an NR radio leg or vice versa. Alternatively, the network can trigger in-band PDCP reconfiguration to dynamically enable or disable PDCP data duplication (for example, based on the radio link condition and UE assistance information).

In an embodiment, a new NR PDCP control Protocol Data Unit (PDU) type is introduced: "PDCP Reconfiguration (more than one RLC)." This new NR PDCP PDU may be used for in-band PDPC reconfiguration. Table 3 includes a description of the PDCP Control PDU type.

TABLE 3

PDCP Control PDU type

| Bit | Description |
| --- | --- |
| 000 | PDCP status report |
| 001 | Interspersed ROHC feedback |
| 010 | PDCP Reconfiguration (more than one RLC) |
| 011-111 | Reserved |

Figure 2:
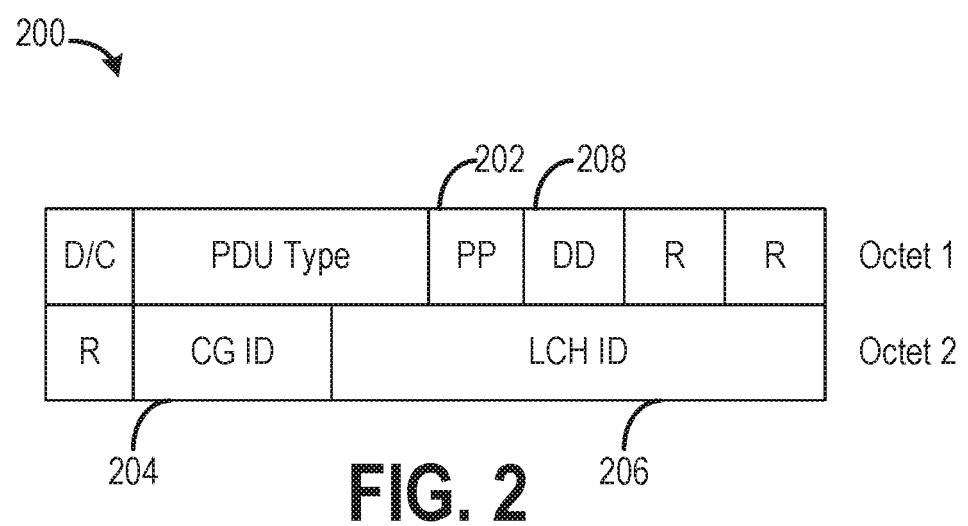
FIG. 2 illustrates an example control Protocol Data Unit for Packet Data Convergence Protocol reconfiguration, according to some embodiments of the present disclosure.

FIG. 2 illustrates an example control PDU 200 for PDCP reconfiguration, according to some implementations. In this example, the control PDU 200 is associated with the new NR PDCP control PDU type. As shown in FIG. 2, the control PDU 200 includes a PP field 202, a CG ID field 204, a LCH ID field 206, and a DD field 208. The PP field 202 indicates whether a primary path is being reconfigured (e.g., by changing the default RLC bearer). For example, the PP field 202 set to 1 indicates reconfiguration of the primary path. In such case Octet 2 is included in the PDU 200. In Octet 2, the CG ID field 204 indicates the Cell Group ID of the primary path and the LCH ID field 206 indicates the logical channel ID of the primary path. The DD field 208 indicates whether PDCP data duplication is disabled or enabled. For example, the DD field 208 set to 0 indicates that PDCP data duplication is disabled, and the DD field 208 set to 1 indicates that PDCP data duplication is enabled.

Furthermore, this control PDU can be further enhanced, for example, to reconfigure the UL-DataSplitThreshold. Alternatively, a separate PDCP control PDU can be introduced to change the PDCP data duplication configuration or to change the primary path.

In an embodiment, the UE directly selects and recommends to the network (e.g., by way of a base station) the action to perform based on the current voice quality and end to end delay measurement. In particular, instead of reporting the delay budget or the robustness indicator to the network, the UE directly sends a recommendation to enable PDCP data duplication, enable TTI bundling, or request lower Modulation and Coding Scheme (MCS).

In an embodiment, a control message may be used to send the recommendation to the base station. Several options are possible for sending this control information. To request enabling PDCP data duplication, the UE sends the control information using RRC signaling, a PDCP control PDU, or a MAC control element. In an example of a MAC control element, the UE can reuse the PDCP Duplication Activation/Deactivation MAC Control Element used by the base station. From the UE to the base station direction, the meaning of this MAC CE would be recommendation of PDCP Duplication Activation/Deactivation. Alternatively, a new PDCP control PDU may be introduced for this purpose.

Figure 3A:
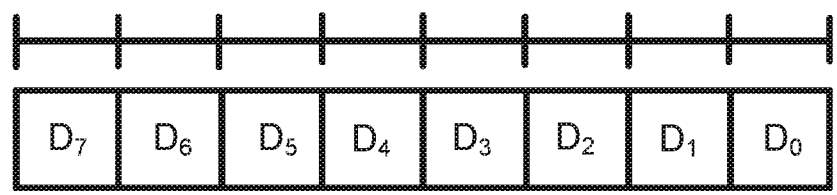
FIGS. 3A and 3B illustrates example Packet Data Convergence Protocol control Protocol Data Units, according to some embodiments of the present disclosure.
Figure 3B:
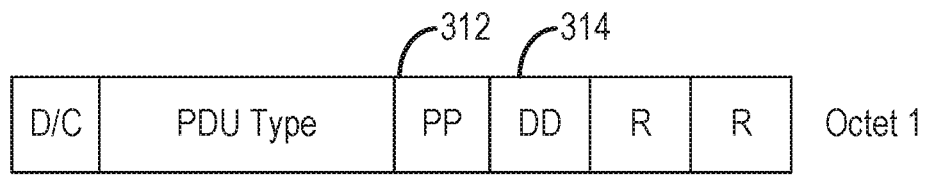

FIGS. 3A and 3B illustrate example PDCP control PDUs used for signaling recommendations, according to some implementations. Specifically, FIG. 3A illustrates a MAC CE 300 that is based on the PDCP Duplication Activation/Deactivation MAC Control Element and FIG. 3B illustrates a new PDCP control PDU 310. As shown in FIG. 3B, the PDCP control PDU 310 include a PP field 312 and a DD field 314. The PP field 312 indicates whether the UE recommends that the network change the primary path. For example, the PP field 312 set to 1 indicates that the UE recommends that the network change the primary path. The DD field 314 indicates whether the UE recommends that the network enable PDCP data duplication. For example, the DD field 314 set to 1 indicates that the UE recommends the network enable PDCP data duplication, and the DD field 314 set to 0 indicates that the UE recommends the network to disable PDCP data duplication.

The figures below describe UEs (e.g., UE 501*a/b*) and eNB/gNBs (e.g., RAN nodes 511*a/b*) that may be configured to implement various aspects of the embodiments described herein.

Figure 4A:
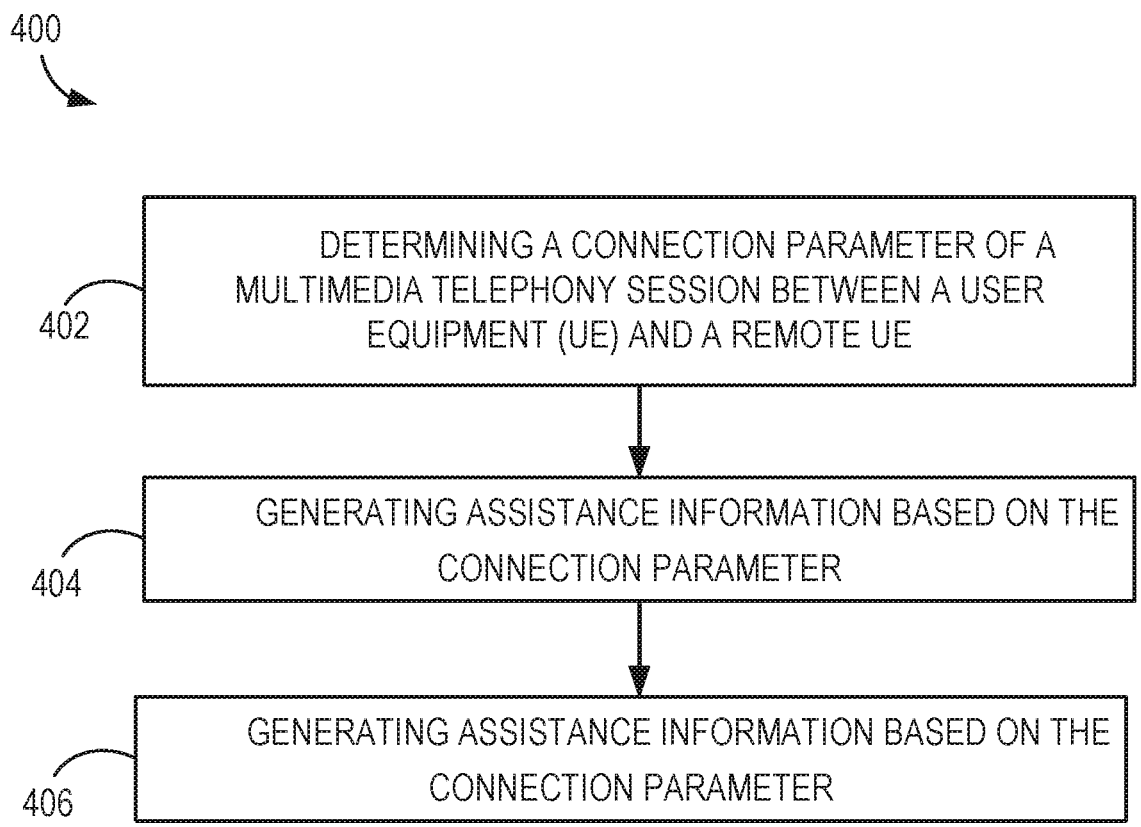
FIGS. 4A, 4B, and 4C each illustrate a flowchart of an example process, according to some embodiments of the present disclosure.
Figure 4B:
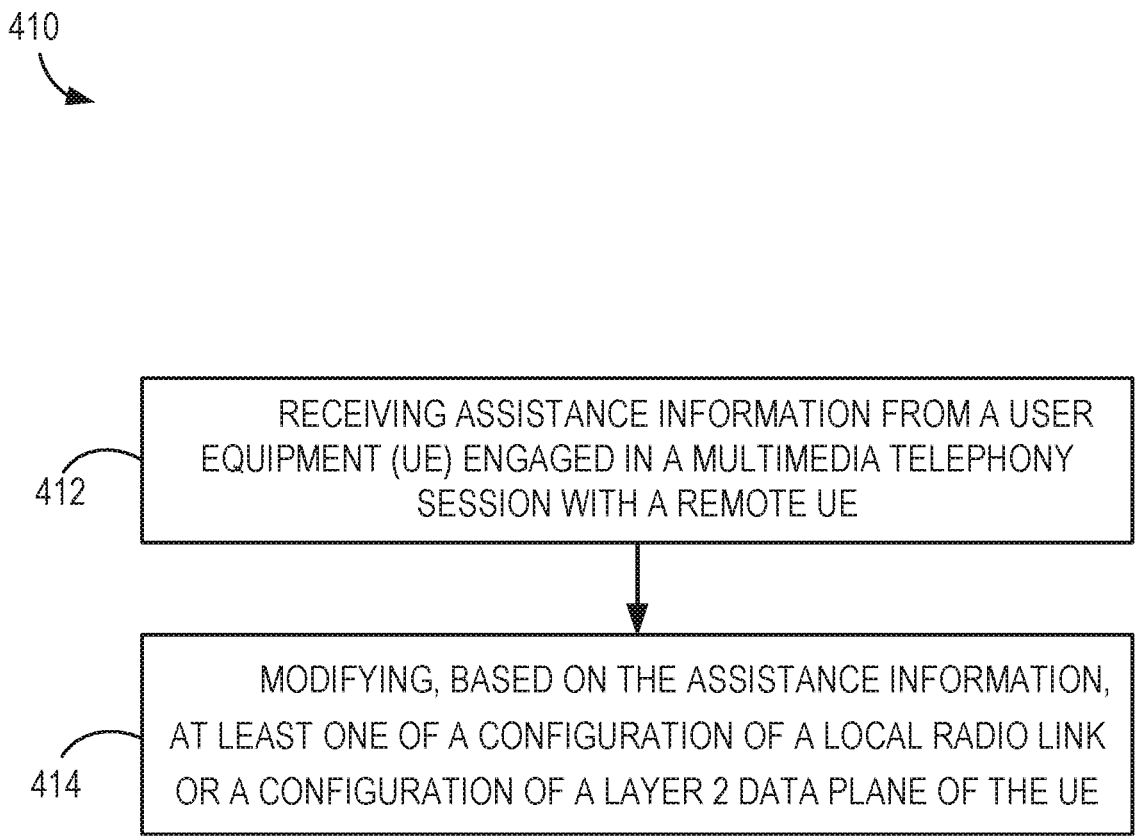
Figure 4C:
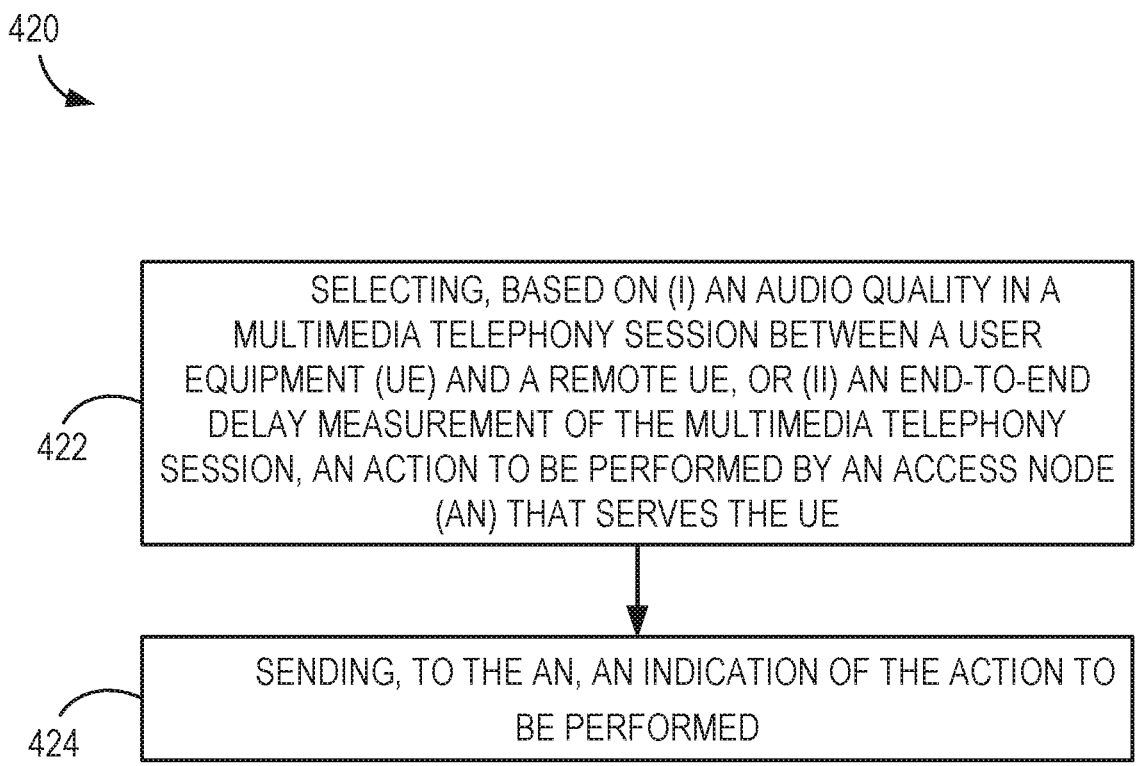
Figure 5:
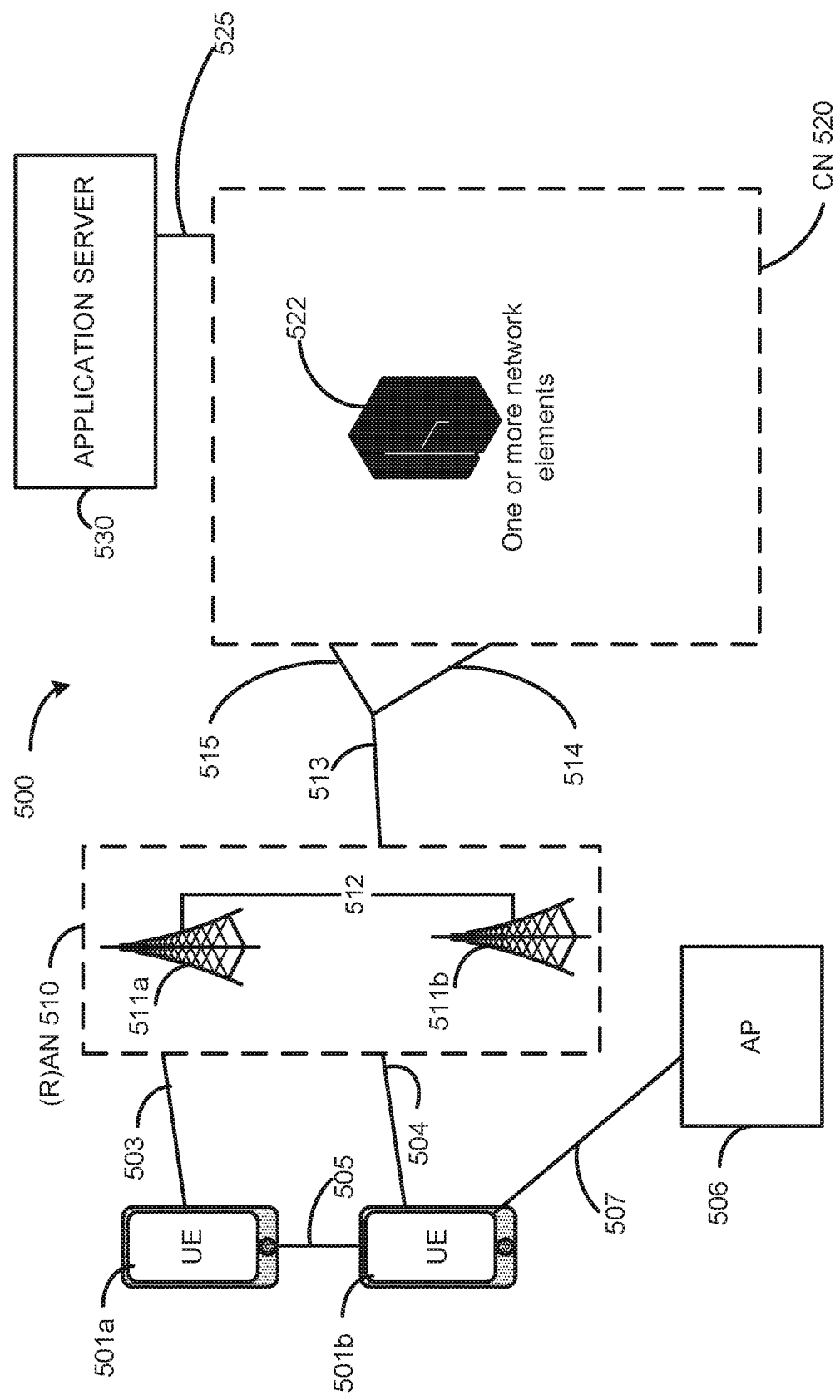
FIG. 5 illustrates an example of a wireless communication system, according to some embodiments of the present disclosure.

FIGS. 4A, 4B, and 4C each illustrate a flowchart of an example process, according to some embodiments. For clarity of presentation, the description that follows generally describes the processes in the context of the other figures in this description. As an example, flowcharts 400, 420 may be performed by a UE (e.g., as shown in FIG. 5) and flowchart 410 may be performed by an access node (e.g., as shown in FIG. 5). However, it will be understood that the processes may be performed, for example, by any suitable system, environment, software, and hardware, or a combination of systems, environments, software, and hardware, as appropriate. In some embodiments, various steps of the processes can be run in parallel, in combination, in loops, or in any order.

FIG. 4A is a flowchart of an example process 400 for providing a network with assistance information from a user equipment (UE) that is participating in a multimedia telephony session, in accordance with various embodiments. This UE may be the same as or substantially similar to the UEs 501 of FIG. 5. At step 402, the process 400 involves determining a connection parameter of a multimedia telephony session between a user equipment (UE) and a remote UE. At step 404, the process 400 involves generating assistance information based on the connection parameter. At step 406, the process 400 involves sending, using a medium access control (MAC) control element, the assistance information to an access node (AN) serving the UE.

In some embodiments, the determining the connection parameter of the multimedia telephony session involves measuring an end-to-end delay of the multimedia telephony session.

In some embodiments, generating assistance information based on the connection parameter involves requesting from the remote UE a delay budget of a remote radio link of the remote UE; determining a delay budget for a local radio link of the UE based on at least one of: an end-to-end delay measurement of the multimedia telephony session, or the delay budget of the remote radio link of the multimedia telephony session; and generating a delay budget indicator based on the delay budget for the local radio link, the assistance information including the delay budget indicator.

In some embodiments, determining the connection parameter of the multimedia telephony session involves determining a robustness of a codec used in connection with the multimedia telephony session.

In some embodiments, generating assistance information based on the connection parameter involves generating a robustness indicator based on at least one of: feedback from a jitter buffer indicative of a packet drop rate or robustness of a codec used in connection with the multimedia telephony session to packet loss, where the assistance information includes the robustness indicator.

In some embodiments, the robustness indicator includes a maximum supported packet loss rate over a radio local link of the UE.

In some embodiments, the codec robustness indicator includes a target block error rate (BLER).

In some embodiments, generating assistance information based on the connection parameter involves determining a packet loss rate applicable for a local radio link of the UE based on: (i) a robustness of a codec used in connection with the multimedia telephony session to packet loss, and (ii) a packet loss observed on a remote radio link of the remote UE; and generating a robustness indicator based on the packet loss rate, the assistance information including the robustness indicator.

In some embodiments, the assistance information further includes a request to the access node to adjust a delay budget of a local radio link of the UE.

In some embodiments, the assistance information further including a request to the access node to enable Packet Data Convergence Protocol (PDCP) packet duplication.

In some embodiments, a plurality of Radio Link Control (RLC) bearers are connected to a Packet Data Convergence Protocol (PDCP) entity of the UE, and the assistance information further includes a request to the access node to change a default RLC bearer of the plurality of RLC bearers.

FIG. 4B is a flowchart of an example process 410 for a base station performing a remedial action based on assistance information received from the UE. At step 412, the process 410 involves receiving assistance information from a user equipment (UE) engaged in a multimedia telephony session with a remote UE. At step 414, the process 410 involves modifying, based on the assistance information, at least one of a configuration of a local radio link or a configuration of a layer 2 data plane of the UE.

In some embodiments, the assistance information includes at least one of: (i) a delay budget indicator indicative of a delay budget of the local radio link, or (ii) a robustness indicator indicative of a robustness of a codec used in connection with the multimedia telephony session.

In some embodiments, modifying at least one of the configuration of the local radio link or the configuration of the layer 2 data plane of the UE involves enabling packet data convergence protocol (PDCP) packet duplication; changing a default radio link control (RLC) bearer of a plurality of RLC bearers connected to a PDCP entity of the UE; or changing connected mode DRX (C-DRX) cycle length.

In some embodiments, the PDCP packet duplication is enabled in response to a determination that an end-to-end delay of the multimedia telephony session or a robustness of a codec used in connection with the multimedia telephony session do not meet respective conditions.

In some embodiments, modifying at least one of the configuration of the local radio link or the configuration of the layer 2 data plane of the UE includes using an in-band packet data convergence protocol (PDCP) reconfiguration to: change a default radio link control (RLC) bearer of a Packet Data Convergence Protocol (PDCP) entity of the UE; or enable or disable PDCP data duplication.

In some embodiments, the in-band PDCP reconfiguration uses a new radio (NR) PDCP control protocol data unit (PDU).

FIG. 4C is a flowchart of an example process 420 for providing by a UE a recommendation to a base station based on a status of a multimedia telephony session in which the UE is participating. At step 422, the process 420 involves selecting, based on (i) an audio quality in a multimedia telephony session between a user equipment (UE) and a remote UE, or (ii) an end-to-end delay measurement of the multimedia telephony session, an action to be performed by an access node (AN) that serves the UE. At step 424, the process 420 involves sending, to the AN, an indication of the action to be performed.

In some embodiments, sending the indication involves: sending the indication in an Radio Resource Control (RRC) signal, a Packet Data Convergence Protocol (PDCP) control protocol data unit (PDU), or a medium access control (MAC) control element.

In some embodiments, the action is at least one of: enabling data duplication, changing a default radio link control (RLC) bearer of a Packet Data Convergence Protocol (PDCP) entity of the UE, enabling transmission time interval (TTI) ?bundling, or lowering a Modulation and Coding Scheme (MCS).

The example processes shown in FIGS. 4A, 4B, and 4C can be modified or reconfigured to include additional, fewer, or different steps (not shown in the figures), which can be performed in the order shown or in a different order.

FIG. 5 illustrates an example of a wireless communication system 500. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 500 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 500 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 5, the system 500 includes UE 501a and UE 501b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501b, RAN 510, and AP 506 may be configured to utilize LWA operation and/or LWIP operation. The LWA operation may involve the UE 501b in RRC_CONNECTED being configured by a RAN node 511a-b to utilize radio resources of LTE and WLAN. LWIP operation may involve the UE 501b using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 7), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs.

Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system (e.g., when CN 520 is an EPC 620 as in FIG. 6), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network-in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6:
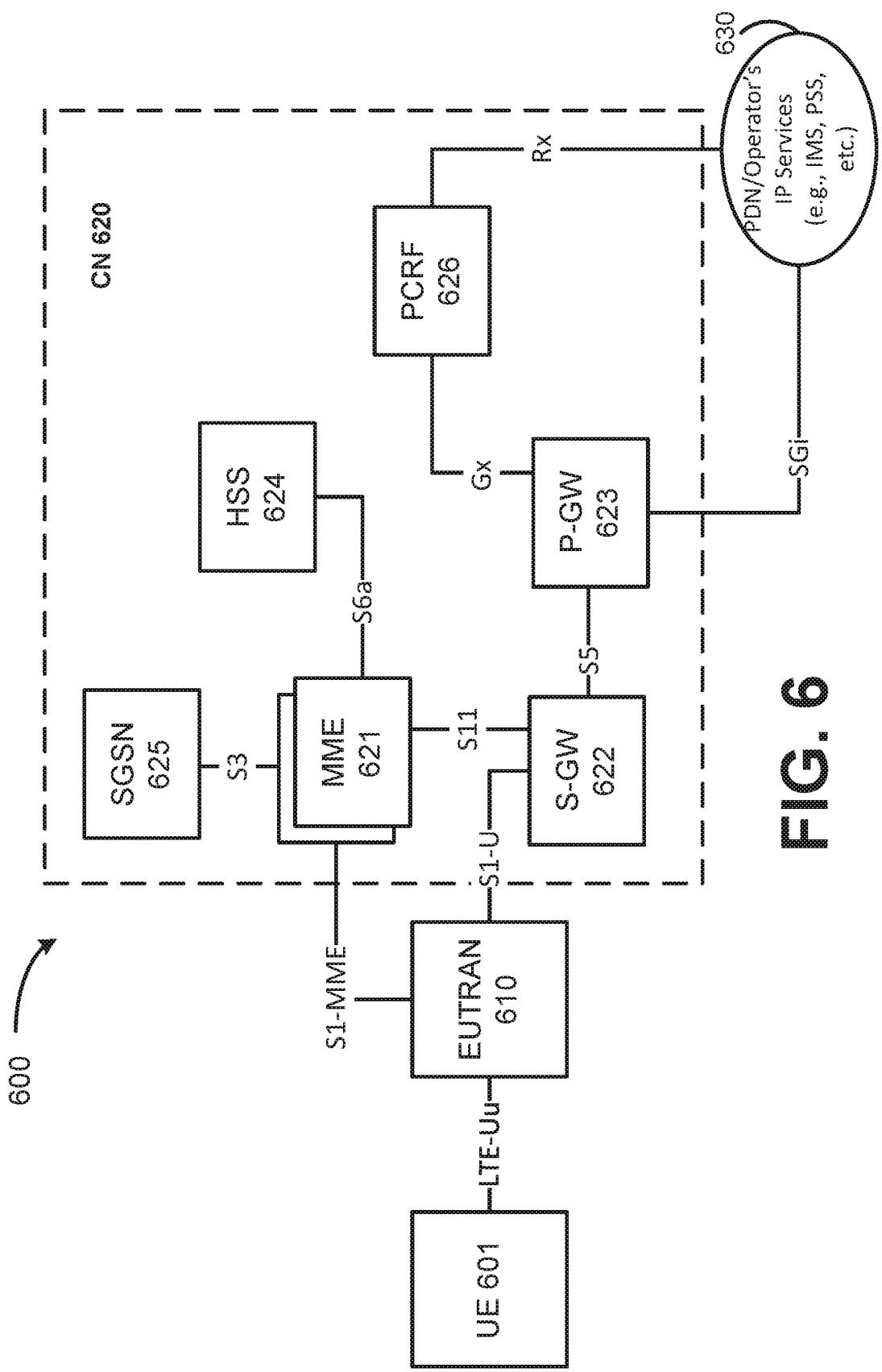
FIG. 6 illustrates an example architecture of a system including a CN, according to some embodiments of the present disclosure.

FIG. 6 illustrates an example architecture of a system 600 including a first CN 620, in accordance with various embodiments. In this example, system 600 may implement the LTE standard wherein the CN 620 is an EPC 620 that corresponds with CN 520 of FIG. 5. Additionally, the UE 601 may be the same or similar as the UEs 501 of FIG. 5, and the E-UTRAN 610 may be a RAN that is the same or similar to the RAN 510 of FIG. 5, and which may include RAN nodes 511 discussed previously. The CN 620 may comprise MMEs 621, an S-GW 622, a P-GW 623, a HSS 624, and a SGSN 625.

The MMEs 621 may be similar in function to the control plane of legacy SGSN, and may implement MM functions to keep track of the current location of a UE 601. The MMEs 621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. That are used to maintain knowledge about a present location of the UE 601, provide user identity confidentiality, and/or perform other like services to users/subscribers. Each UE 601 and the MME 621 may include an MM or EMM sublayer, and an MM context may be established in the UE 601 and the MME 621 when an attach procedure is successfully completed. The MM context may be a data structure or database object that stores MM-related information of the UE 601. The MMEs 621 may be coupled with the HSS 624 via an S6a reference point, coupled with the SGSN 625 via an S3 reference point, and coupled with the S-GW 622 via an S1 reference point.

The SGSN 625 may be anode that serves the UE 601 by tracking the location of an individual UE 601 and performing security functions. In addition, the SGSN 625 may perform Inter-EPC node signaling for mobility between 2G/3G and E-UTRAN 3GPP access networks; PDN and S-GW selection as specified by the MMEs 621; handling of UE 601 time zone functions as specified by the MMEs 621; and MME selection for handovers to E-UTRAN 3GPP access network. The S3 reference point between the MMEs 621 and the SGSN 625 may enable user and bearer information exchange for inter-3GPP access network mobility in idle and/or active states.

The HSS 624 may comprise a database for network users, including subscription-related information to support the network entities' handling of communication sessions. The EPC 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc. An S6a reference point between the HSS 624 and the MMEs 621 may enable transfer of subscription and authentication data for authenticating/authorizing user access to the EPC 620 between HSS 624 and the MMEs 621.

The S-GW 622 may terminate the S1 interface 513 ("S1-U" in FIG. 6) toward the RAN 610, and routes data packets between the RAN 610 and the EPC 620. In addition, the S-GW 622 may be a local mobility anchor point for inter-RAN node handovers and also may provide an anchor for inter-3GPP mobility. Other responsibilities may include lawful intercept, charging, and some policy enforcement. The S11 reference point between the S-GW 622 and the MMEs 621 may provide a control plane between the MMEs 621 and the S-GW 622. The S-GW 622 may be coupled with the P-GW 623 via an S5 reference point.

The P-GW 623 may terminate an SGi interface toward a PDN 630. The P-GW 623 may route data packets between the EPC 620 and external networks such as a network including the application server 530 (alternatively referred to as an "AF") via an IP interface 525 (see e.g., FIG. 5). In embodiments, the P-GW 623 may be communicatively coupled to an application server (application server 530 of FIG. 5 or PDN 630 in FIG. 6) via an IP communications interface 525 (see, e.g., FIG. 5). The S5 reference point between the P-GW 623 and the S-GW 622 may provide user plane tunneling and tunnel management between the P-GW 623 and the S-GW 622. The S5 reference point may also be used for S-GW 622 relocation due to UE 601 mobility and if the S-GW 622 needs to connect to a non-collocated P-GW 623 for the required PDN connectivity. The P-GW 623 may further include a node for policy enforcement and charging data collection (e.g., PCEF (not shown)). Additionally, the SGi reference point between the P-GW 623 and the packet data network (PDN) 630 may be an operator external public, a private PDN, or an intra operator packet data network, for example, for provision of IMS services. The P-GW 623 may be coupled with a PCRF 626 via a Gx reference point.

PCRF 626 is the policy and charging control element of the EPC 620. In a non-roaming scenario, there may be a single PCRF 626 in the Home Public Land Mobile Network (HPLMN) associated with a UE 601's Internet Protocol Connectivity Access Network (IP-CAN) session. In a roaming scenario with local breakout of traffic, there may be two PCRFs associated with a UE 601's IP-CAN session, a Home PCRF (H-PCRF) within an HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate QoS and charging parameters. The PCRF 626 may provision this rule into a PCEF (not shown) with the appropriate TFT and QCI, which commences the QoS and charging as specified by the application server 630. The Gx reference point between the PCRF 626 and the P-GW 623 may allow for the transfer of QoS policy and charging rules from the PCRF 626 to PCEF in the P-GW 623. An Rx reference point may reside between the PDN 630 (or "AF 630") and the PCRF 626.

Figure 7:
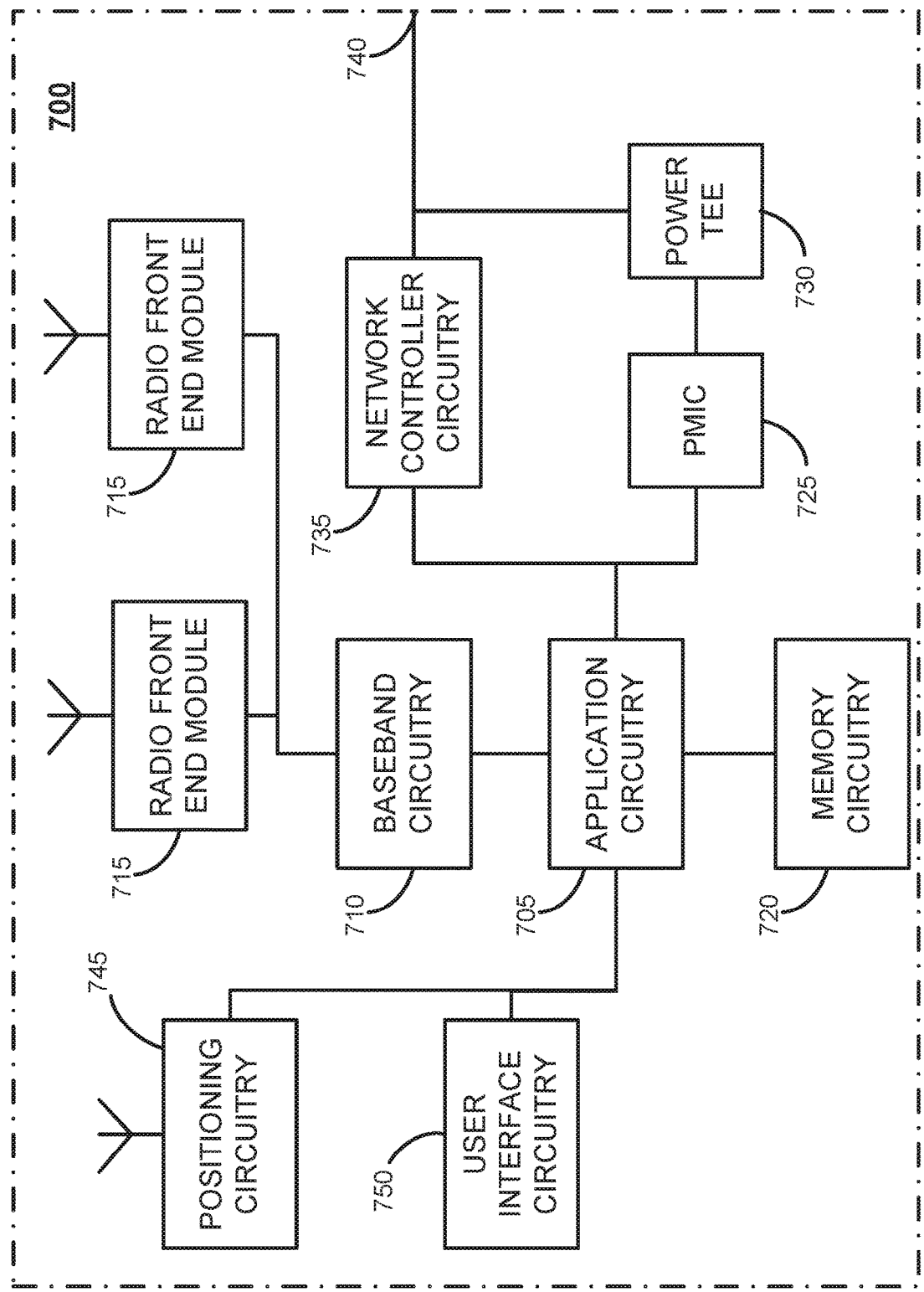
FIG. 7 illustrates an example of infrastructure equipment, according to some embodiments of the present disclosure.

FIG. 7 illustrates an example of infrastructure equipment 700 in accordance with various embodiments. The infrastructure equipment 700 (or "system 700") may be implemented as a base station, radio head, RAN node such as the RAN nodes 511 and/or AP 506 shown and described previously, application server(s) 530, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, 12C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2@ provided by Cavium™, Inc.; a MIPS-based design from MIPS Technologies, Inc. Such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. Of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 8.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, micro-phones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 511, etc.), or the like.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 8:
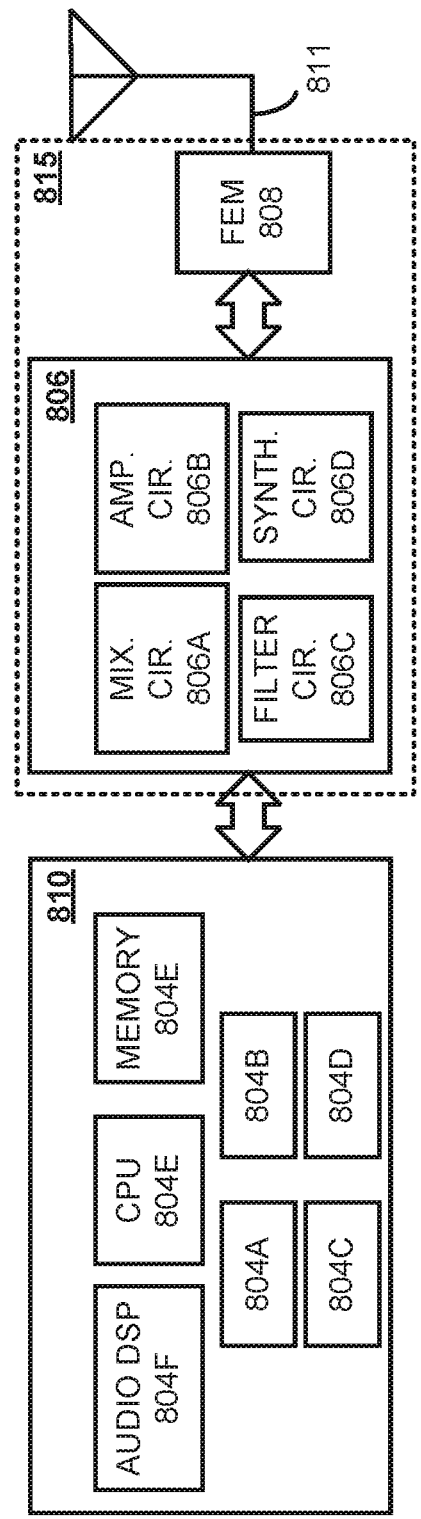
FIG. 8 illustrates example components of baseband circuitry and radio front end modules (RFEM), according to some embodiments of the present disclosure.

FIG. 8 illustrates example components of baseband circuitry 810 and radio front end modules (RFEM) 815 in accordance with various embodiments. The baseband circuitry 810 corresponds to the baseband circuitry 710 of FIG. 7. The RFEM 815 corresponds to the RFEM 715 of FIG. 7. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 705/(see FIG. 7) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., sixth generation (6G), etc.). In other embodiments, some or all of the functionality of baseband processors 804A-D may be included in modules stored in the memory 804G and executed via a Central Processing Unit (CPU) 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio digital signal processor(s) (DSP) 804F. The audio DSP(s) 804F include elements for compression/decompression and echo cancellation and may include other suitable processing elements in other embodiments.

In some embodiments, each of the processors 804A-804E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 705/of FIGS. 7 and 8); an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 705 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. To facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 810 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 705 depending on the desired output frequency. In some embodiments, a divider control input (e.g., N) may be determined from a look-up table based on a channel indicated by the application circuitry 705.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 705 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
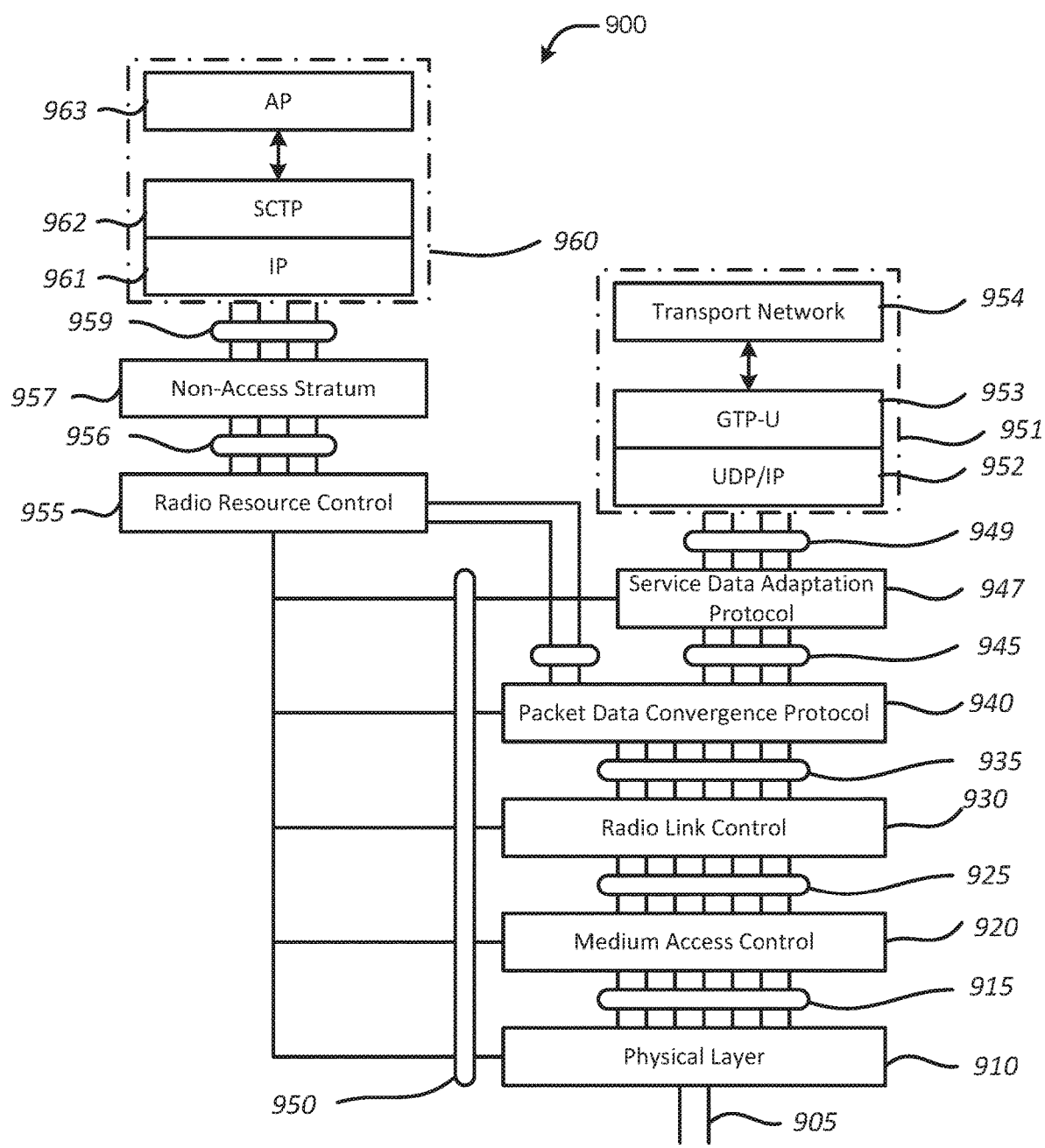
FIG. 9 illustrates various protocol functions that may be implemented in a wireless communication device, according to some embodiments of the present disclosure.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the 5G/NR system standards and LTE system standards, but some or all of the aspects of FIG. 9 may be applicable to other wireless communication network systems as well.

The protocol layers of arrangement 900 may include one or more of PHY 910, MAC 920, RLC 930, PDCP 940, SDAP 947, RRC 955, and NAS layer 957, in addition to other higher layer functions not illustrated. The protocol layers may include one or more service access points (e.g., items 959, 956, 950, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 910 may process requests from and provide indications to an instance of MAC 920 via one or more PHY-SAP 915. According to some embodiments, requests and indications communicated via PHY-SAP 915 may comprise one or more transport channels.

Instance(s) of MAC 920 may process requests from, and provide indications to, an instance of RLC 930 via one or more MAC-SAPs 925. These requests and indications communicated via the MAC-SAP 925 may comprise one or more logical channels. The MAC 920 may perform mapping between the logical channels and transport channels, multiplexing of MAC SDUs from one or more logical channels onto TBs to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through HARQ, and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels. The RLC 930 may operate in a plurality of modes of operation, including: Transparent Mode™, Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP 940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more SDAP-SAP 949. These requests and indications communicated via SDAP-SAP 949 may comprise one or more QoS flows. The SDAP 947 may map QoS flows to DRBs, and vice versa, and may also mark QFIs in DL and UL packets. A single SDAP entity 947 may be configured for an individual PDU session. In the UL direction, the NG-RAN 510 may control the mapping of QoS Flows to DRB(s) in two different ways, reflective mapping or explicit mapping. For reflective mapping, the SDAP 947 of a UE 501 may monitor the QFIs of the DL packets for each DRB, and may apply the same mapping for packets flowing in the UL direction. For a DRB, the SDAP 947 of the UE 501 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC-SAPs 956. The main services and functions of the RRC 955 may include broadcast of system information (e.g., included in MIBs or SIBs related to the NAS), broadcast of system information related to the access stratum (AS), paging, establishment, maintenance and release of an RRC connection between the UE 501 and RAN 510 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 957 may form the highest stratum of the control plane between the UE 501 and the AMF. The NAS 957 may support the mobility of the UEs 501 and the session management procedures to establish and maintain IP connectivity between the UE 501 and a P-GW in LTE systems.

According to various embodiments, one or more protocol entities of arrangement 900 may be implemented in UEs 501, RAN nodes 511, AMF in NR implementations or MME 621 in LTE implementations, UPF in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMF, etc. May communicate with a respective peer protocol entity that may be implemented in or on another device using the services of respective lower layer protocol entities to perform such communication. In some embodiments, a gNB-CU of the gNB 511 may host the RRC 955, SDAP 947, and PDCP 940 of the gNB that controls the operation of one or more gNB-DUs, and the gNB-DUs of the gNB 511 may each host the RLC 930, MAC 920, and PHY 910 of the gNB 511.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 957, which includes an IP layer 961, an SCTP 962, and an application layer signaling protocol (AP) 963.

In NR implementations, the AP 963 may be an NG application protocol layer (NGAP or NG-AP) 963 for the NG interface 513 defined between the NG-RAN node 511 and the AMF, or the AP 963 may be an Xn application protocol layer (XnAP or Xn-AP) 963 for the Xn interface 512 that is defined between two or more RAN nodes 511.

The NG-AP 963 may support the functions of the NG interface 513 and may comprise Elementary Procedures (EPs). An NG-AP EP may be a unit of interaction between the NG-RAN node 511 and the AMF. The NG-AP 963 services may comprise two groups: UE-associated services (e.g., services related to a UE 501) and non-UE-associated services (e.g., services related to the whole NG interface instance between the NG-RAN node 511 and AMF). These services may include functions including, but not limited to: a paging function for the sending of paging requests to NG-RAN nodes 511 involved in a particular paging area; a UE context management function for allowing the AMF to establish, modify, and/or release a UE context in the AMF and the NG-RAN node 511; a mobility function for UEs 501 in ECM-CONNECTED mode for intra-system HOs to support mobility within NG-RAN and inter-system HOs to support mobility from/to EPS systems; a NAS Signaling Transport function for transporting or rerouting NAS messages between UE 501 and AMF; a NAS node selection function for determining an association between the AMF and the UE 501; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 511 via CN 520; and/or other like functions.

The XnAP 963 may support the functions of the Xn interface 512 and may comprise XnAP basic mobility procedures and XnAP global procedures. The XnAP basic mobility procedures may comprise procedures used to handle UE mobility within the NG RAN 511 (or E-UTRAN 610), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 963 may be an S1 Application Protocol layer (S1-AP) 963 for the S1 interface 513 defined between an E-UTRAN node 511 and an MME, or the AP 963 may be an X2 application protocol layer (X2AP or X2-AP) 963 for the X2 interface 512 that is defined between two or more E-UTRAN nodes 511.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node 511 and an MME 621 within an LTE CN 520. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or S1-AP or X2AP messages in LTE implementations). The SCTP 962 may ensure reliable delivery of signaling messages between the RAN node 511 and the AMF/MME 621 based, in part, on the IP protocol, supported by the IP 961. The Internet Protocol layer (IP) 961 may be used to perform packet addressing and routing functionality. In some implementations the IP layer 961 may use point-to-point transmission to deliver and convey PDUs. In this regard, the RAN node 511 may comprise L2 and L1 layer communication links (e.g., wired or wireless) with the MME/AMF to exchange information.

Ina second example, a user plane protocol stack may comprise, in order from highest layer to lowest layer, SDAP 947, PDCP 940, RLC 930, MAC 920, and PHY 910. The user plane protocol stack may be used for communication between the UE 501, the RAN node 511, and UPF in NR implementations or an S-GW 622 and P-GW 623 in LTE implementations. In this example, upper layers 951 may be built on top of the SDAP 947, and may include a user datagram protocol (UDP) and IP security layer (UDP/IP) 952, a General Packet Radio Service (GPRS) Tunneling Protocol for the user plane layer (GTP-U) 953, and a User Plane PDU layer (UP PDU) 963.

The transport network layer 954 (also referred to as a "transport layer") may be built on IP transport, and the GTP-U 953 may be used on top of the UDP/IP layer 952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node 511 and the S-GW 622 may utilize an S1-U interface to exchange user plane data via a protocol stack comprising an L1 layer (e.g., PHY 910), an L2 layer (e.g., MAC 920, RLC 930, PDCP 940, and/or SDAP 947), the UDP/IP layer 952, and the GTP-U 953. The S-GW 622 and the P-GW 623 may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE 501 and the session management procedures to establish and maintain IP connectivity between the UE 501 and the P-GW 623.

Moreover, although not shown by FIG. 9, an application layer may be present above the AP 963 and/or the transport network layer 954. The application layer may be a layer in which a user of the UE 501, RAN node 511, or other network element interacts with software applications being executed, for example, by application circuitry 705. The application layer may also provide one or more interfaces for software applications to interact with communications systems of the UE 501 or RAN node 511, such as the baseband circuitry 810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 10:
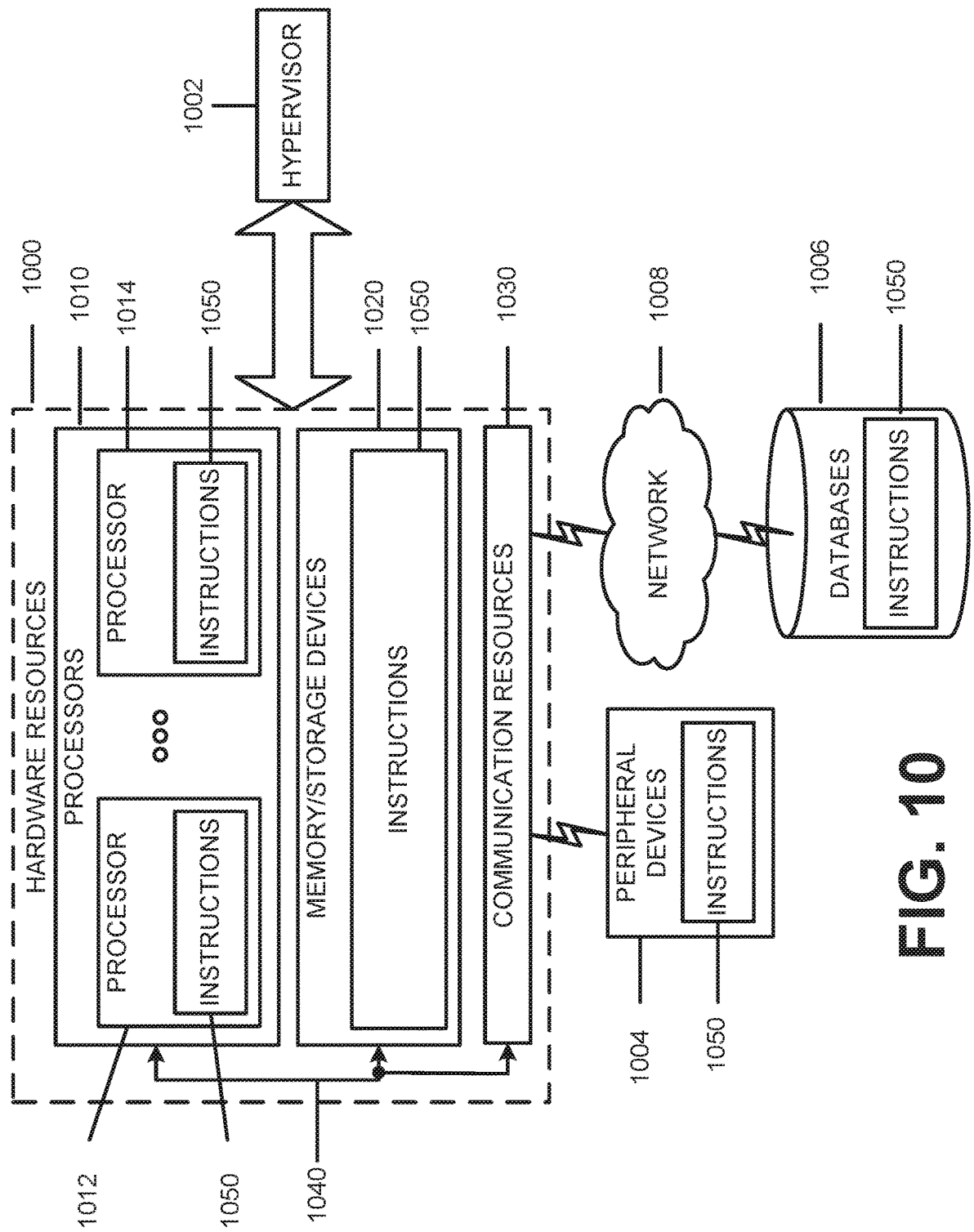
FIG. 10 is a block diagram illustrating components, according to some example embodiments, able to read instructions from a machine-readable or computer-readable medium (e.g., a non-transitory machine-readable storage medium) and perform any one or more of the methodologies discussed herein, according to some embodiments of the present disclosure.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method comprising: determining a connection parameter of a multimedia telephony session between a user equipment (UE) and a remote UE; generating assistance information based on the connection parameter; and sending, using a medium access control (MAC) control element, the assistance information to an access node (AN) serving the UE.

Example 2 may include the method of example 1 or some other example herein, wherein the connection parameter is a voice call quality of the multimedia telephony session.

Example 3 may include the method of example 1 or some other example herein, wherein the MAC control element is a bit rate recommendation query message.

Example 4 may include the method of example 1 or some other example herein, wherein sending the assistance information to the AN serving the UE is performed by a cellular protocol stack of the UE.

Example 5 may include the method of example 1 or some other example herein, wherein determining the connection parameter and generating the assistance information is performed by a media layer management engine of the UE.

Example 6 may include the method of example 1 or some other example herein, wherein determining the connection parameter of the multimedia telephony session comprises measuring an end-to-end delay of the multimedia telephony session.

Example 7 may include the method of example 1 or some other example herein, wherein the assistance information comprises a delay budget indicator indicative of a delay budget of a radio local link of the UE.

Example 8 may include the method of example 7 or some other example herein, wherein the delay budget is separately for Uplink (UL) and Downlink (DL) of the radio local link of the UE.

Example 9 may include the method of example 7 or some other example herein, wherein the delay budget is provided in millisecond.

Example 10 may include the method of example 7 or some other example herein, wherein the delay budget is coded on 7 bits of the MAC control element.

Example 11 may include the method of example 1 or some other example herein, wherein generating assistance information based on the connection parameter comprises requesting from the remote UE a delay budget of a remote radio link of the remote UE; determining a delay budget for a local radio link of the UE based on at least one of an end-to-end delay measurement of the multimedia telephony session, or the delay budget of the remote radio link of the multimedia telephony session; and generating a delay budget indicator based on the delay budget for the local radio link, wherein the assistance information comprises the delay budget indicator.

Example 12 may include the method of example 1 or some other example herein, wherein determining the connection parameter of the multimedia telephony session comprises determining a robustness of a codec used in connection with the multimedia telephony session.

Example 13 may include the method of example 12 or some other example herein, wherein the method further comprises: adding a flag to recommend to the AN to increase robustness of the codec.

Example 14 may include the method of example 13 or some other example herein, wherein adding the flag to recommend to the AN to increase robustness of the codec is performed in response to a media layer in the UE detecting that an audio decoder of the UE is reaching its limit in terms of sustaining a current packet loss rate.

Example 15 may include the method of example 1 or some other example herein, wherein generating assistance information based on the connection parameter comprises generating a robustness indicator based on at least one of: feedback from a jitter buffer indicative of a packet drop rate or robustness of a codec used in connection with the multimedia telephony session to packet loss, wherein the assistance information comprises the robustness indicator.

Example 16 may include the method of example 15 or some other example herein, wherein the robustness indicator comprises a maximum supported packet loss rate over a radio local link of the UE.

Example 17 may include the method of example 15 or some other example herein, wherein the codec robustness indicator comprises a target block error rate (BLER).

Example 18 may include the method of example 1 or some other example herein, wherein generating assistance information based on the connection parameter comprises determining a packet loss rate applicable for a local radio link of the UE based on: (i) a robustness of a codec used in connection with the multimedia telephony session to packet loss, and (ii) a packet loss observed on a remote radio link of the remote UE; generating a robustness indicator based on the packet loss rate, wherein the assistance information comprises the robustness indicator.

Example 19 may include the method of example 1 or some other example herein, the assistance information further comprising a request to the access node to adjust a delay budget of a local radio link of the UE.

Example 20 may include the method of example 1 or some other example herein, the assistance information further comprising a request to the access node to enable Packet Data Convergence Protocol (PDCP) packet duplication.

Example 21 may include the method of example 1 or some other example herein, wherein a plurality of Radio Link Control (RLC) bearers are connected to a Packet Data Convergence Protocol (PDCP) entity of the UE, and wherein the assistance information further comprises a request to the access node to change a default RLC bearer of the plurality of RLC bearers.

Example 22 may include a method comprising: receiving assistance information from a user equipment (UE) engaged in a multimedia telephony session with a remote UE; and modifying, based on the assistance information, at least one of a configuration of a local radio link or a configuration of a layer 2 data plane of the UE.

Example 23 may include the method of example 22 or some other example herein, wherein the assistance information comprises at least one of: (i) a delay budget indicator indicative of a delay budget of the local radio link, or (ii) a robustness indicator indicative of a robustness of a codec used in connection with the multimedia telephony session.

Example 24 may include the method of example 22 or some other example herein, wherein modifying at least one of the configuration of the local radio link or the configuration of the layer 2 data plane of the UE comprises: enabling packet data convergence protocol (PDCP) packet duplication; changing a default radio link control (RLC) bearer of a plurality of RLC bearers connected to a PDCP entity of the UE; or changing connected mode discontinuous reception (C-DRX) cycle length.

Example 25 may include the method of example 24 or some other example herein, wherein the PDCP packet duplication is enabled in response to a determination that an end-to-end delay of the multimedia telephony session or a robustness of a codec used in connection with the multimedia telephony session do not meet respective conditions.

Example 26 may include the method of example 22 or some other example herein, wherein modifying at least one of the configuration of the local radio link or the configuration of the layer 2 data plane of the UE comprises using an in-band packet data convergence protocol (PDCP) reconfiguration to: change a default radio link control (RLC) bearer of a Packet Data Convergence Protocol (PDCP) entity of the UE; or enable or disable PDCP data duplication.

Example 27 may include the method of example 26 or some other example herein, wherein the in-band PDCP reconfiguration uses a new radio (NR) PDCP control protocol data unit (PDU).

Example 28 may include the method of example 27 or some other example herein, wherein the PDU comprises (i) a PP bit that indicates reconfiguration of a primary RLC path, (ii) CG ID bit that indicates a Cell Group ID of the primary path, (iii) an LCH ID bit that indicates a logical channel ID of the primary path, and (iv) a DD bit that indicates whether PDCP data duplication is enabled.

Example 29 may include the method of example 27 or some other example herein, wherein the PDU further reconfigures an UL-DataSplitThreshold.

Example 30 may include the method of example 22 or some other example herein, wherein modifying at least one of the configuration of the local radio link or the configuration of the layer 2 data plane of the UE is further based on radio resource availability, New Radio Dual Connectivity support, radio link quality and type of fading, or a number of users to serve.

Example 31 may include the method of example 22 or some other example herein, wherein modifying at least one of the configuration of the local radio link or the configuration of the layer 2 data plane of the UE comprises at least one of: adapting a maximum number of Hybrid automatic repeat request (HARQ) retransmission, enabling or disabling transmission time interval (TTI) bundling, enabling split bearer with Packet Data Convergence Protocol (PDCP) redundancy in case of dual connectivity or carrier aggregation, changing a default radio link in case of New Radio Dual Connectivity support, or changing a connected mode discontinuous reception (C-DRX) cycle length or disabling C-DRX.

Example 32 may include a method comprising: selecting, based on (i) an audio quality in a multimedia telephony session between a user equipment (UE) and a remote UE, or (ii) an end-to-end delay measurement of the multimedia telephony session, an action to be performed by an access node (AN) that serves the UE; and sending, to the AN, an indication of the action to be performed.

Example 33 may include the method of example 32 or some other example herein, wherein sending the indication comprises sending the indication in a Radio Resource Control (RRC) signal, a Packet Data Convergence Protocol (PDCP) control protocol data unit (PDU), or a medium access control (MAC) control element.

Example 34 may include the method of example 32 or some other example herein, wherein the action is at least one of: enabling data duplication, changing a default radio link control (RLC) bearer of a Packet Data Convergence Protocol (PDCP) entity of the UE, enabling transmission time interval (TTI) bundling, or lowering a Modulation and Coding Scheme (MCS).

Example 35 may include the method of example 32 or some other example herein, wherein sending the indication of the action to be performed comprises sending the indication using a Packet Data Convergence Protocol (PDCP) control protocol data unit (PDU).

Example 36 may include the method of example 35 or some other example herein, wherein the PDU comprises (i) a PP bit that indicates whether the UE recommends the AN to change a primary path, and (ii) a DD bit that indicates whether the UE recommends to enable PDCP data duplication.

Example 37 may include an apparatus comprising means to perform one or more elements of a method described in or related to any of examples 1-36, or any other method or process described herein.

Example 38 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 39 may include an apparatus comprising logic, modules, or circuitry to perform one or more elements of a method described in or related to any of examples 1-36, or any other method or process described herein.

Example 40 may include a method, technique, or process as described in or related to any of examples 1-36, or portions or parts thereof.

Example 41 may include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 42 may include a signal as described in or related to any of examples 1-36, or portions or parts thereof.

Example 43 may include a datagram, packet, frame, segment, protocol data unit (PDU), or message as described in or related to any of examples 1-36, or portions or parts thereof, or otherwise described in the present disclosure.

Example 44 may include a signal encoded with data as described in or related to any of examples 1-36, or portions or parts thereof, or otherwise described in the present disclosure.

Example 45 may include a signal encoded with a datagram, packet, frame, segment, protocol data unit (PDU), or message as described in or related to any of examples 1-36, or portions or parts thereof, or otherwise described in the present disclosure.

Example 46 may include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 47 may include a computer program comprising instructions, wherein execution of the program by a processing element is to cause the processing element to carry out the method, techniques, or process as described in or related to any of examples 1-36, or portions thereof.

Example 48 may include a signal in a wireless network as shown and described herein.

Example 49 may include a method of communicating in a wireless network as shown and described herein.

Example 50 may include a system for providing wireless communication as shown and described herein.

Example 51 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
   determining a connection parameter of a multimedia telephony session between a user equipment (UE) and a remote UE;
   generating assistance information based on the connection parameter; and
   sending the assistance information to an access node (AN) serving the UE,
   wherein a plurality of Radio Link Control (RLC) bearers are connected to a Packet Data Convergence Protocol (PDCP) entity of the UE, and wherein the assistance information further comprises a request to the access node to change a default RLC bearer of the plurality of RLC bearers.

2. The method of claim 1, wherein determining the connection parameter of the multimedia telephony session comprises:
   measuring an end-to-end delay of the multimedia telephony session.

3. The method of claim 1, wherein generating assistance information based on the connection parameter comprises:
   requesting from the remote UE a delay budget of a remote radio link of the remote UE;
   determining a delay budget for a local radio link of the UE based on at least one of: an end-to-end delay measurement of the multimedia telephony session, or the delay budget of the remote radio link of the multimedia telephony session; and
   generating a delay budget indicator based on the delay budget for the local radio link, wherein the assistance information comprises the delay budget indicator.

4. The method of claim 1, wherein determining the connection parameter of the multimedia telephony session comprises:
   determining a robustness of a codec used in connection with the multimedia telephony session.

5. The method of claim 1, wherein generating assistance information based on the connection parameter comprises:
   generating a robustness indicator based on at least one of: feedback from a jitter buffer indicative of a packet drop rate or robustness of a codec used in connection with the multimedia telephony session to packet loss, wherein the assistance information comprises the robustness indicator.

6. The method of claim 5, wherein the robustness indicator comprises a maximum supported packet loss rate over a radio local link of the UE.

7. The method of claim 5, wherein the codec robustness indicator comprises a target block error rate (BLER).

8. The method of claim 1, wherein generating assistance information based on the connection parameter comprises:
   determining a packet loss rate applicable for a local radio link of the UE based on: (i) a robustness of a codec used in connection with the multimedia telephony session to packet loss, and (ii) a packet loss observed on a remote radio link of the remote UE; and
   generating a robustness indicator based on the packet loss rate, wherein the assistance information comprises the robustness indicator.

9. The method of claim 1, the assistance information further comprising a request to the access node to adjust a delay budget of a local radio link of the UE.

10. The method of claim 1, the assistance information further comprising a request to the access node to enable Packet Data Convergence Protocol (PDCP) packet duplication.

11. One or more processors configured to execute instructions to perform operations comprising:
    determining a connection parameter of a multimedia telephony session between a user equipment (UE) and a remote UE;
    generating assistance information based on the connection parameter; and
    sending the assistance information to an access node (AN) serving the UE,
    wherein a plurality of Radio Link Control (RLC) bearers are connected to a Packet Data Convergence Protocol (PDCP) entity of the UE, and wherein the assistance information further comprises a request to the access node to change a default RLC bearer of the plurality of RLC bearers.

12. The one or more processors of claim 11, wherein determining the connection parameter of the multimedia telephony session comprises:
    measuring an end-to-end delay of the multimedia telephony session.

13. The one or more processors of claim 11, wherein generating assistance information based on the connection parameter comprises:
    requesting from the remote UE a delay budget of a remote radio link of the remote UE;
    determining a delay budget for a local radio link of the UE based on at least one of: an end-to-end delay measurement of the multimedia telephony session, or the delay budget of the remote radio link of the multimedia telephony session; and generating a delay budget indicator based on the delay budget for the local radio link, wherein the assistance information comprises the delay budget indicator.

14. The one or more processors of claim 11, wherein determining the connection parameter of the multimedia telephony session comprises:
   determining a robustness of a codec used in connection with the multimedia telephony session.

15. The one or more processors of claim 11, wherein generating assistance information based on the connection parameter comprises:
   generating a robustness indicator based on at least one of: feedback from a jitter buffer indicative of a packet drop rate or robustness of a codec used in connection with the multimedia telephony session to packet loss, wherein the assistance information comprises the robustness indicator.

16. The one or more processors of claim 15, wherein the robustness indicator comprises a maximum supported packet loss rate over a radio local link of the UE.

17. The one or more processors of claim 15, wherein the codec robustness indicator comprises a target block error rate (BLER).

18. A non-transitory computer storage medium encoded with instructions that, when executed by one or more processors, cause the one or more processors to perform operations comprising:
   determining a connection parameter of a multimedia telephony session between a user equipment (UE) and a remote UE;
   generating assistance information based on the connection parameter; and
   sending the assistance information to an access node (AN) serving the UE,
   wherein a plurality of Radio Link Control (RLC) bearers are connected to a Packet Data Convergence Protocol (PDCP) entity of the UE, and wherein the assistance information further comprises a request to the access node to change a default RLC bearer of the plurality of RLC bearers.

* * * * *